United States Patent [19]
Naimpally et al.

[11] Patent Number: 5,418,617
[45] Date of Patent: May 23, 1995

[54] MOTION COMPENSATION USING MINIMUM BITS PER MOTION BLOCK AS CRITERION FOR BLOCK MATCHING

[75] Inventors: Saiprasad V. Naimpally, Langhorne; Siu-Leong Iu, Bensalem; Edwin R. Meyer, Levittown, all of Pa.

[73] Assignee: Matsushita Electric Corporation of America, Secaucus, N.J.

[21] Appl. No.: 742,398

[22] Filed: Aug. 8, 1991

[51] Int. Cl.⁶ .............................................. H04N 7/12
[52] U.S. Cl. .................................... 348/413; 348/416
[58] Field of Search ............... 358/133, 135, 136, 105; 348/405, 413, 419, 390, 413, 416

[56] References Cited

U.S. PATENT DOCUMENTS

| | | | |
|---|---|---|---|
| 4,562,468 | 12/1985 | Koga | 348/413 |
| 4,972,260 | 11/1990 | Fujikawa et al. | 358/136 |
| 4,999,705 | 3/1991 | Puri | 358/136 |
| 5,025,482 | 6/1991 | Murakami et al. | 358/135 |
| 5,093,720 | 3/1992 | Krause et al. | 358/133 |
| 5,111,294 | 5/1992 | Asai et al. | 358/136 |

OTHER PUBLICATIONS

Ziegler, "Hierarchical Motion Estimation Using the Phase Correlation Method in 140 Mbit/s HDTV Coding", *Proceedings of the Third International Workshop of HDTV*, Sep. 1, 1989, pp. 131–137.
Thoma et al., "Motion Compensating Interpolation Considering Covered and Uncovered Background", *Signal Processing Image Communications*, vol. 1, No. 2, Oct. 1989, pp. 191–212.
Kappagantula et al., "Motion Compensated Interframe Image Prediction", *IEEE Transactions on Communications*, vol. 33, No. 9, Sep. 1985, pp. 1011–1015.
Gonzales et al., "DCT Coding for Motion Video Storage Using Adaptive Arithmetic Coding", *Signal Processing Image Communication*, vol. 2, No. 2, Sep. 1990, pp. 145–154.
"On Comparing Motion-Interpolation Structures for Video Coding", A. Puri and R. Ararind, Visual Communications and Image Processing '90, SPIE vol. 1360, pp. 1560–1571.
"MPEG Video Simulation Model Three (SM3)", Simulation Model Editorial Group, Jul. 25, 1990.
"Advanced Digital Television Description", by The Advanced Television Research Consortium; David Sarnoff Research Center, NBC, North American Philips, Thomson Consumer Electronics, Feb. 27, 1991.

*Primary Examiner*—Alvin E. Oberley
*Assistant Examiner*—Minsun Oh
*Attorney, Agent, or Firm*—Ratner & Prestia

[57] ABSTRACT

Apparatus for selecting a block of data in a previous frame to be used as a predicted block for a given block in a current frame in a system that reduces the bit rate by codifying the difference between the predicted block and the given block in a given manner by deriving the differences between the given block in the current frame and a plurality of blocks in the previous frame and selecting as the predicted block that block for which the codification of its differences with the given block requires the least number of bits. The apparatus can also select a predicted block from a number of blocks selected in accordance with ABD or SBD techniques.

11 Claims, 7 Drawing Sheets

MOTION COMPENSATION USING MINIMUM BITS PER MOTION BLOCK AS CRITERION FOR BLOCK MATCHING

BACKGROUND

The objective of image coding is to compress the number of bits needed to represent an image without introducing significant visible distortion in the coded image. A system which is often used for image coding utilizes an interframe hybrid coding system with motion compensation. This system consists of a DPCM loop in which a prediction of the current frame is subtracted from the current frame and the result is transformed by a two-dimensional Discrete Cosine Transform (DCT) into transform coefficients. A property of the DCT is that it decorrelates the image data block by block. The DCT coefficients are quantized and amplitude and run length coded. By this process the number of bits used to represent the image is considerably reduced. The resulting bitstream is inherently variable in rate. Therefore, a FIFO buffer is used to smooth out the variation in the bit rate and output a constant bit rate which is lower than the original bit rate of the video signal by at least an order of magnitude. A buffer control strategy is used in order to prevent overflow or underflow of the buffer. Typically, the buffer control is accomplished by monitoring the status of the FIFO buffer and varying the quantization step size of the quantizer.

An important part of the above system is the forming of the prediction of the current frame. Normally, the prediction that is most suited for video frames is the motion compensated previous frame. The motion compensation is performed on blocks of pixels, called motion blocks, by block matching. For every motion block of pixels in the current frame of video, a block referred to as a matching block is found in the previous frame which resembles it as closely as possible. This block is the predictor for the motion block in the current video frame.

Presently known methods for block matching employ a criterion such as Minimum Absolute Block Difference (MABD) or Minimum Squared Block Difference (MSBD). A figure of merit is derived indicating how close the motion block of the current frame is to a block being examined in the previous frame, and a match is declared if the figure of merit is less than some arbitrarily selected threshold value. In a case where a number of candidates come close to but do not exceed the threshold, prior methods pick the one with the smallest ABD or SBD without regard to the number of bits required to codify them for transmission.

BRIEF SUMMARY OF THE INVENTION

In this invention, a new criterion is used for selecting a matching block for use in a predicted frame. The differences between a motion block and each of the blocks in the search area of the previous frame are determined, and the block having the difference requiring the smallest number of bits for codification in the system in which it is being used is selected as the matching block. The advantage of this criterion is that it selects the block from the previous frame having a difference requiring the least number of bits for transmission rather than a criterion that is unrelated to that number of bits. After all, reduction of bits is the primary purpose of the system. For example, if two blocks in the previous frame have the same ABD, prior systems would require an arbitrary choice to be made and the chosen block may require more bits for transmission than the block not chosen. In this invention, however, the choice would always be the one requiring the fewest bits for transmission.

The concept on which an MABD or MSBD block matching system is based is the selection of a block in the previous frame that is pictorially most like, and hopefully identical to, the motion block in the current frame so that, as noted, there is no consideration of the number of bits required for codification. If using as a criterion for match the least number of codified bits required for codifying the pixel differences between a motion block and a block in a previous frame does not select a matching block that is pictorially most like the motion block, any differences between them are what is transmitted by the system, but greater differences mean more bits.

MABD or MSBD block matching systems may find a number of blocks in the previous frame that are very close to the selection threshold, but the closest one is selected, and if a number of the blocks are identical, an arbitrary choice is made. Since the motion block in the current frame is usually compared with each of the blocks of a search area in the previous frame at the same time the selection of a block requiring the least number of codified bits requires a significant amount of hardware.

Operating an MABD or MSBD system in series with a system of this invention can achieve the best features of each. Thus, if a number, of MABD or MSBD systems equal to the number, n, of blocks in a search area are used and means are provided for selecting n' blocks having the best matches within a given range of the criteria, then n' figure of merit calculators providing the number of bits required for codification of respective blocks can be respectively coupled to receive the n' blocks, and the block requiring the least number of codification bits is the one selected.

DETAILED DESCRIPTION OF THE DRAWINGS

Figure 1:
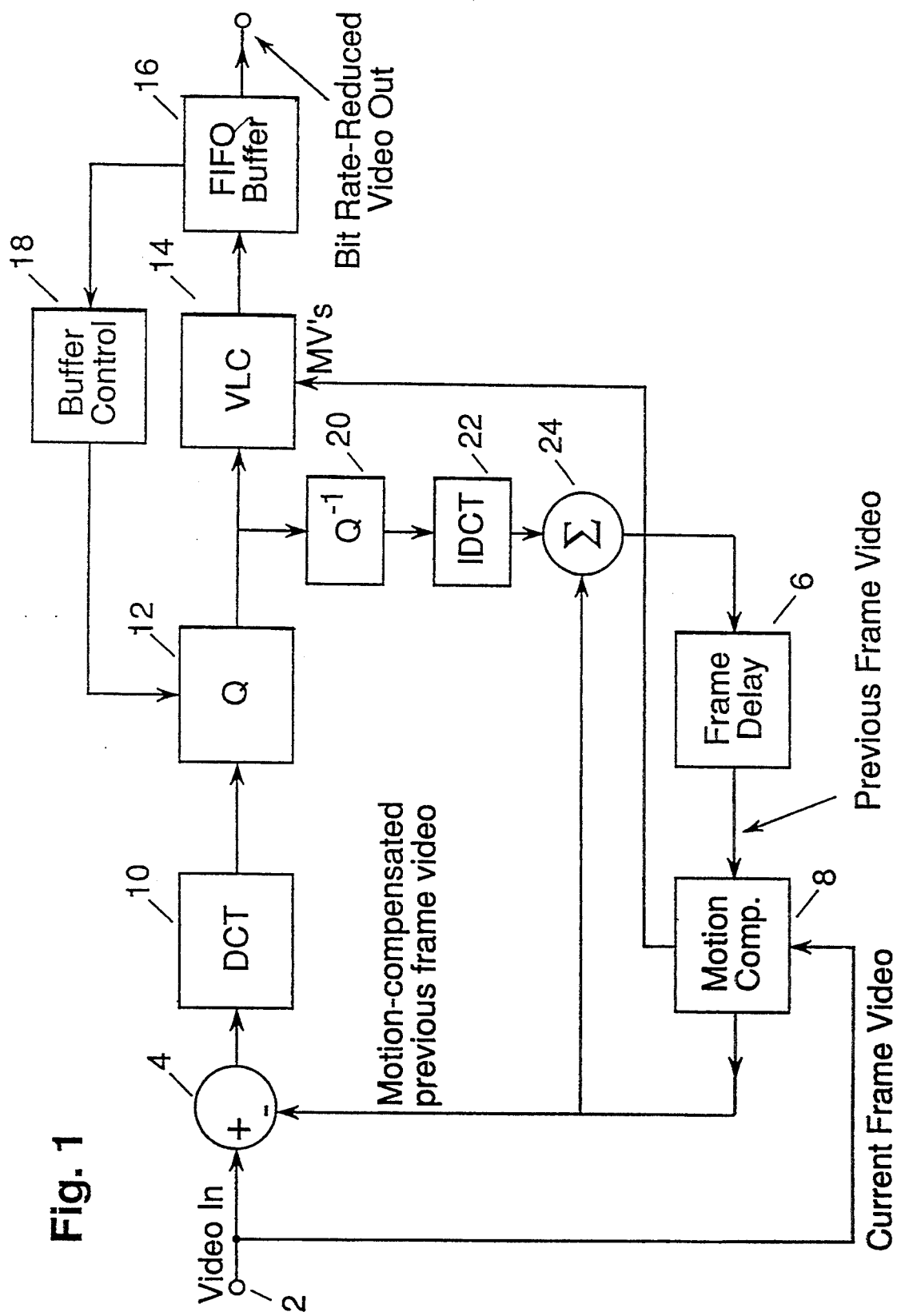
FIG. 1 is a block diagram of a type of image codification system in which the invention may be used.

FIG. 1 illustrates one form of differential pulse code modulation system with motion compensation, that can advantageously use the motion block matching system of this invention. It will be understood that the frames of video information are divided into a number of contiguous blocks called data blocks.

The input video data for a current frame, available at input terminal 2, is connected to the +input of a subtracter 4. The previous frame is stored in a frame delay 6. For each motion block of pixels in the current video frame supplied to a motion compensation means 8, a search is made for a matching data block within a search area of the previous frame that surrounds a block having the same position in the previous frame that the motion block has in the current frame. The relative position of the matching block is indicated by x,y motion vectors that are transmitted to the receiver. The difference in the positions of motion blocks and matching blocks is due to motion.

The block in the frame delay 6 that most nearly matches the matching data block from the current frame is merely a prediction of what that block will be. When signals derived from this predicted block are applied to the negative input of the subtracter 4, its output is the difference between a motion block of a current frame and the predicted motion block. The difference data is transmitted to the receiver after some further processing. The receiver can form the image to be presented from the previous frame and the differences referred to. The differences at the output of the subtracter 4 are applied to a Discrete Cosine Transform, DCT 10, that produces coefficients of horizontal and vertical frequencies. A block of pixels produces an equal sized block of DCT coefficients. These coefficients are scanned so as to provide a train of coefficients to a quantizer 12 where the coefficients are quantized in order to reduce the bit rate without reduction in picture quality.

The output of the quantizer 12 is applied to a variable length coder, VLC, contained in block 14 which reduces the number of bits by run length and Huffman coding. The motion vectors derived by the motion compensation means 8 are also bit rate reduced in the VLC, and the VLC output is applied to a FIFO buffer 16. Whereas the flow of bits to the FIFO buffer 16 is irregular, depending on image content, a steady flow of bits appears at its output. If the buffer 16 approaches overload, a buffer control 18 reduces the number of bits at the output of the quantizer 12 by increasing the size of its quantized steps.

The values of the difference between the current data block and the predicted data block that appeared at the output of the subtracter 4 are recovered, except for the loss caused by the quantizer, by an inverse quantizer 20 and an inverse DCT 22 and applied to one input of an adder 24. The signals for the predicted block at the output of the motion compensator 8 are applied to another input of the adder 24 so that signals for the current block appear at its output and are applied to the frame delay 6. Thus, the entire current frame is in the delay 6, and when the next current frame is being processed, the frame in the frame delay 6 is now the previous frame referred to.

At the start of operations, and periodically thereafter, the frame delay 6 will be cleared so that the differences at the input of the adder 24 will be nearly the same as the current frame, any discrepancies being due to quantization effects.

Figure 2:
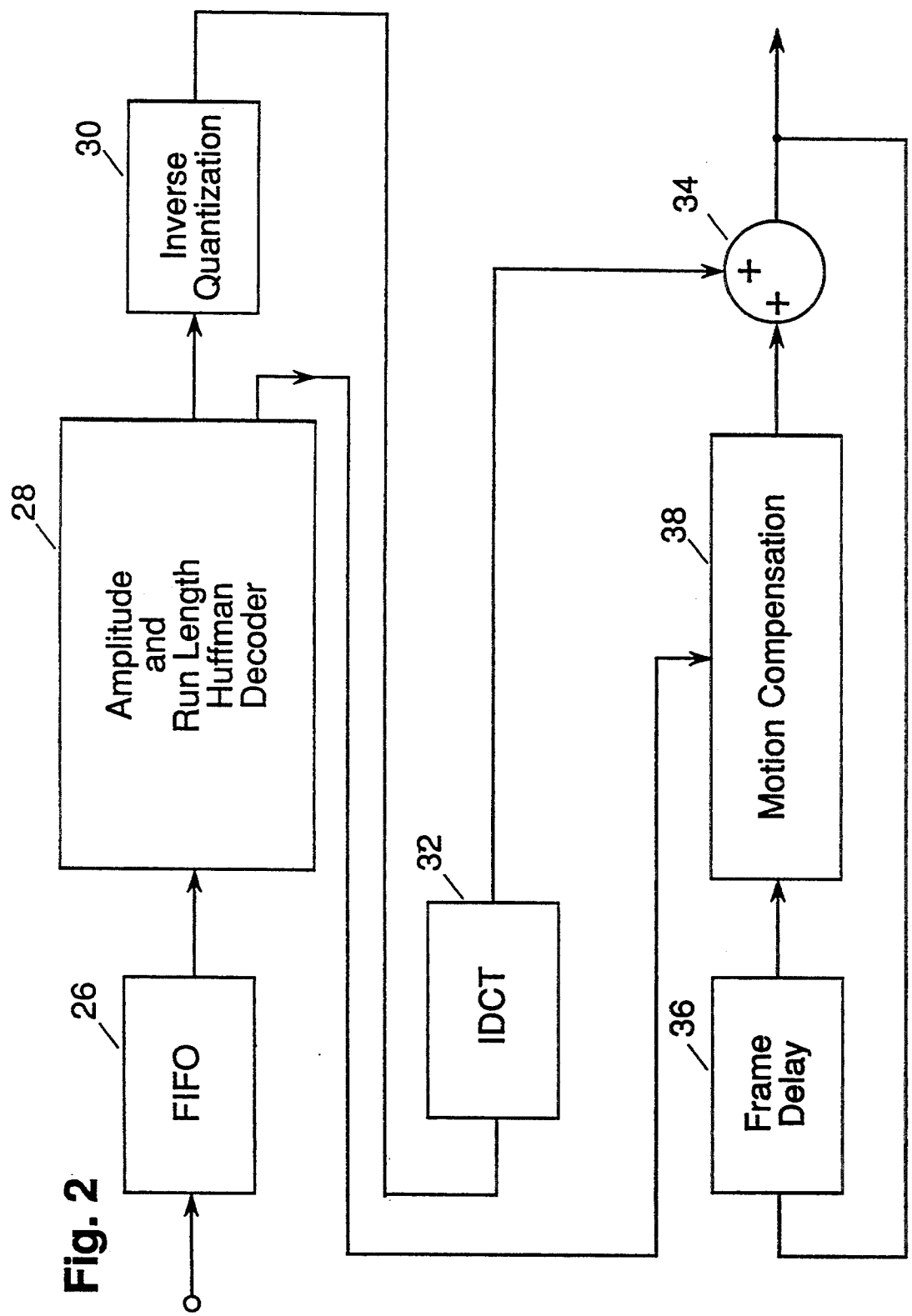
FIG. 2 is a block diagram of a decodifier that produces video signals for the image to be presented from the codified signals provided by the codification system of FIG. 1, FIG. 3 identifies a motion block in a current frame, FIG. 4 identifies a search area in a previous frame.

FIG. 2 shows a system for decoding the signals from the encoder of FIG. 1 and producing video signals for an image to be presented. The bit stream at the output of the FIFO buffer 16 is applied to a FIFO buffer 26 which is connected to an amplitude and run length Huffman decoder 28. An inverse quantizer 30 and an IDCT 32 are connected in the order named between the output of the Huffman decoder 28 and one input of an adder 34. The video signals at the output of the adder 34 are applied via a frame delay 36 and a motion compensator 38 to another input of the adder 34. The x,y motion vectors that originated in the motion compensation means 8 of FIG. 1 are derived from the output of the amplitude and run length decoder 28 and applied to the motion compensation means 38 so that it can form a predicted frame by selecting data from the previous frame stored in the frame delay 36. The addition of the differences from the IDCT 32 to the predicted frame produces the video signals for an image to be presented.

The motion compensator 8 of FIG. 1 operates as follows. The current frame is divided into a number of contiguous motion blocks that may include a number of data blocks or be smaller than a data block. In FIG. 1 a motion block is the same as data block. The motion compensator 8 examines all possible blocks having the same size and shape as the motion block that occur in a searching area of the frame stored in the frame delay 6 and selects one of them as a matching block in accordance with some criterion. This means that the blocks examined will overlap and will be shifted up, down, left or right of each other by a one pixel separation.

Figure 3:
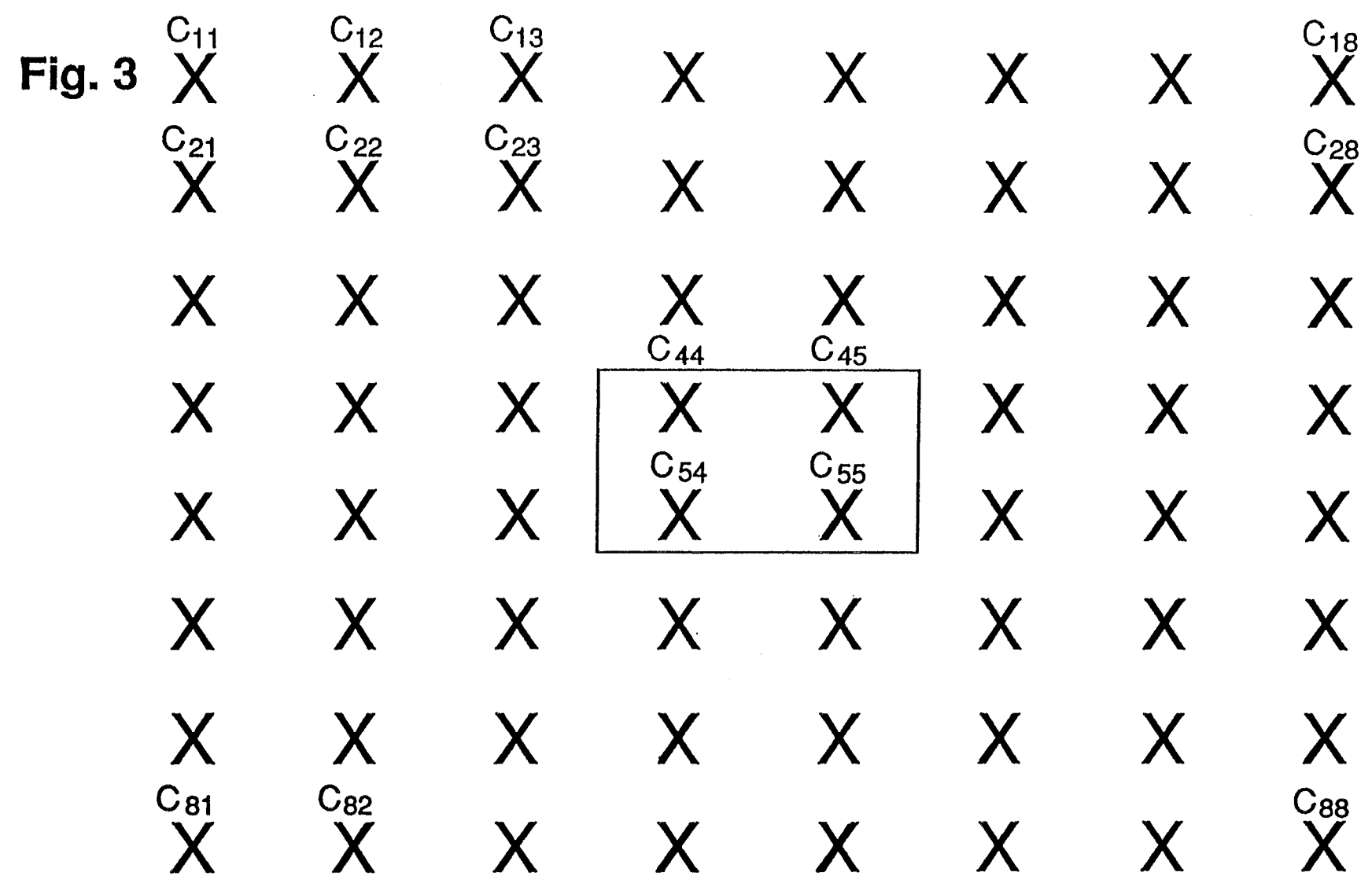
Figure 4:
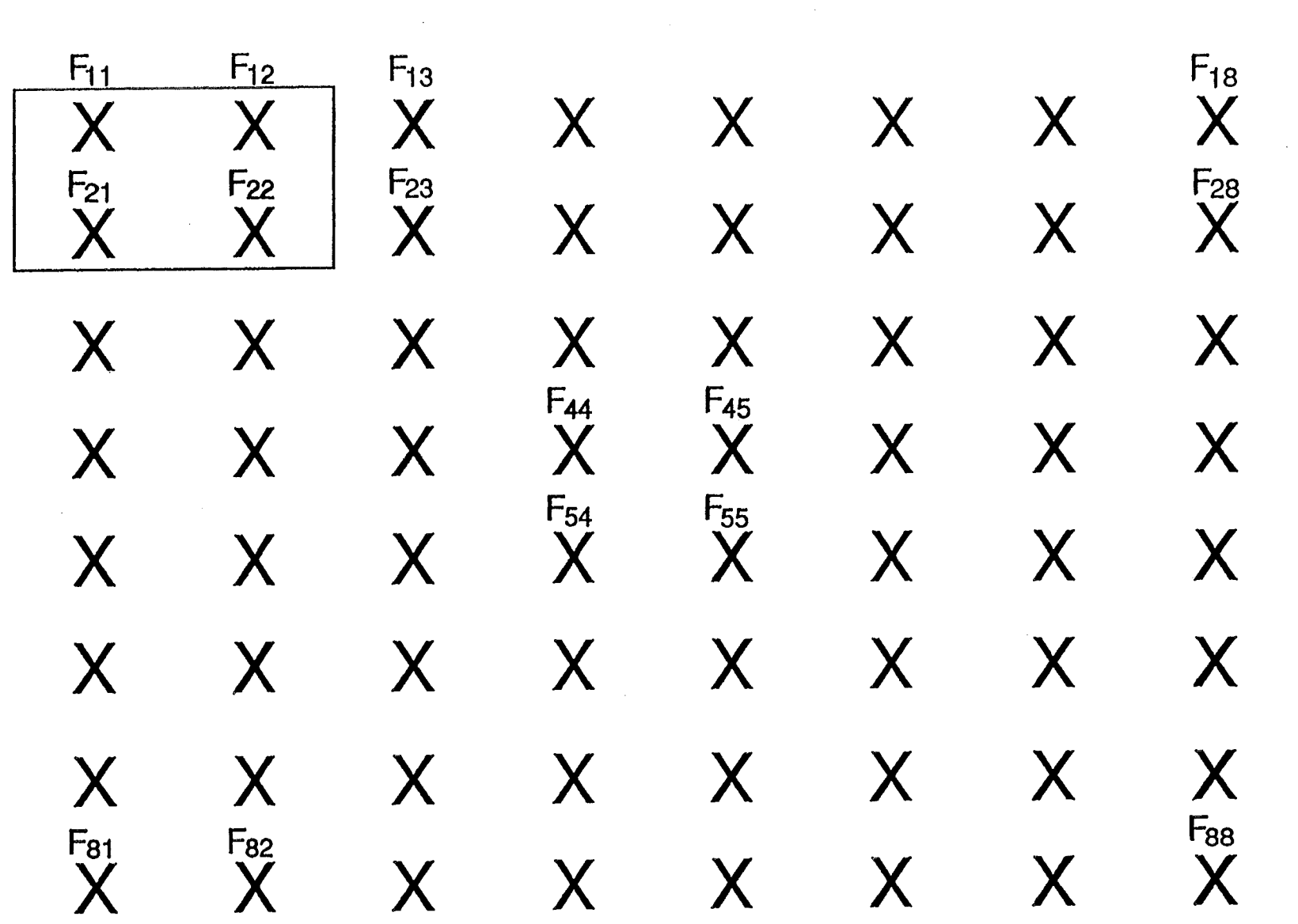

For ease in illustration, a motion block in a current frame is shown in FIG. 3 to be comprised of only four pixels C44, C45, C54, and C55, and the search area in a previous frame is shown in FIG. 4 to be an area of 8×8 pixels that surround a block in the search area designated by pixels F44, F45, F54 and F55 that is in the same position in the previous frame as the motion block C44, C45, C54, and C55 has in the current frame.

The pixels F44, F45, F54 and F55 form just one of the blocks in the search area to be examined. When using the MABD criterion, the sum of the absolute values of the differences of pixel values, C44-F44, C45-F45, C54-F54 and C55-F55 would be compared with the sums of the respective absolute differences of C44, C45, C54 and C55 with all other like groups of four pixels in the search area, and the one having the smallest sum would be selected as the matching block. When using the MSBD criterion, the sums of squares of the differences would be used and the block having the smallest sum would be selected as the matching block.

Figure 5:
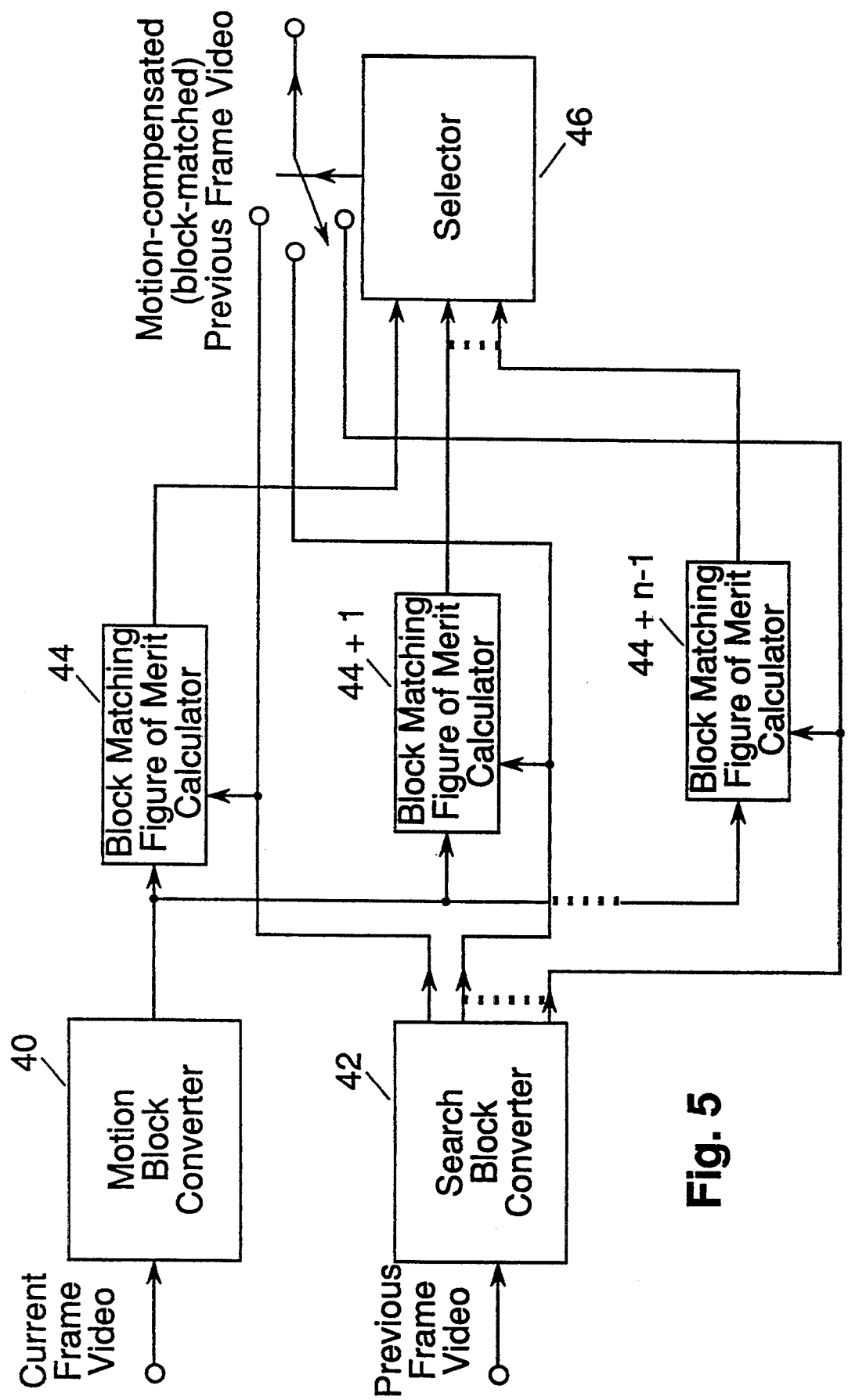
FIG. 5 is a block diagram of a generalized motion block matching system including block matching figure of merit calculators.

Whatever criterion is used, the basic functions are as illustrated by the block diagram of FIG. 5. A motion block converter 40 supplies signals of the motion block from the current frame, and a search block converter 42 simultaneously supplies signals for all n possible blocks in the search area that have the same shape and size as the motion block. The motion block from the convertor 40 is conveyed to n block matching figure of merit calculators, 44 to (44+n−1). Each of these latter calculators provides a figure of merit resulting from the use of a given criterion. Thus, all the calculators 44 through (44+n−1) could use the MABD criterion or all of them could use the MSBD criterion. The figures of merit are applied to means 46 for choosing as the matching block that block having the best figure of merit. In the case of MABD and MSBD, this would be the block in the search area of the previous frame having the lowest sum. Criteria such as MABD and MSBD are used in the hope of finding the block that most resembles the matching block from a pictorial point of view.

Figure 6:
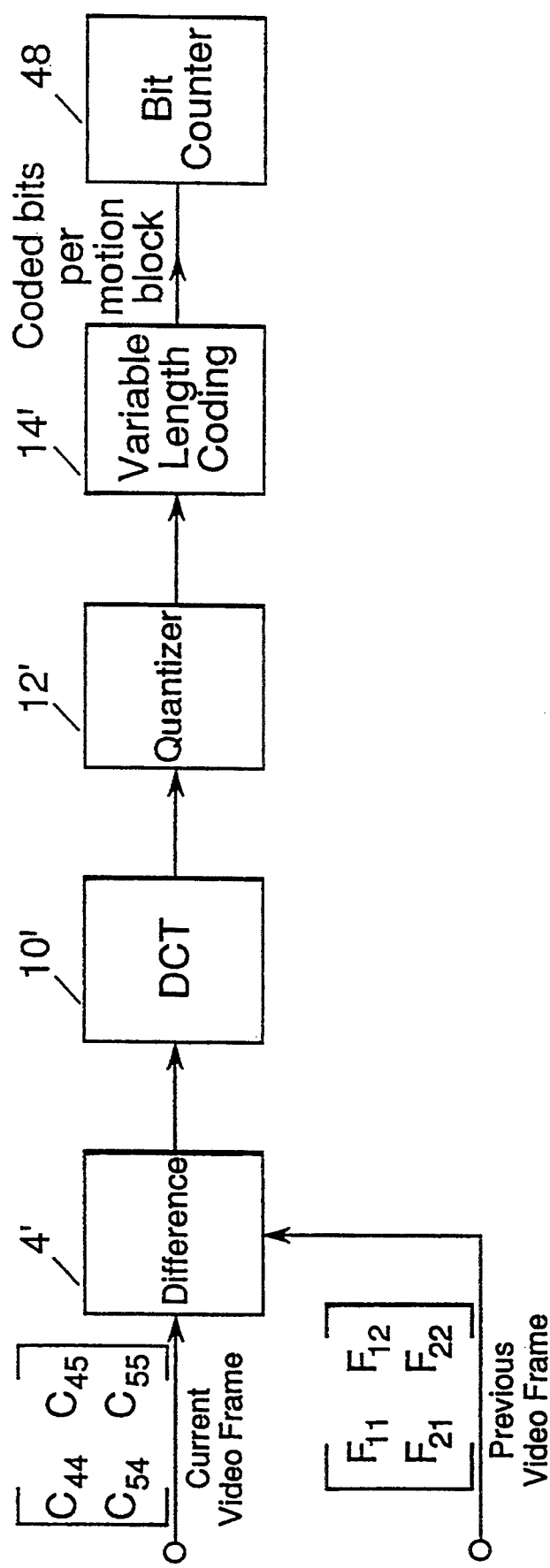
FIG. 6 is a block diagram of a block matching figure of merit calculator that may be used in this invention.

FIG. 6 illustrates a block matching figure of merit calculator of this invention that could be used at each of block matching figure of merit calculators 44 to (44+n−1) of FIG. 5. It is comprised of components corresponding to those used in the codification system of FIG. 1 that are designated by the same numbers primed. The figure of merit is the total number of bits required to codify the differences between the pixels of the matching block and the pixels of a block in the search area, and is derived by a bit counter 48. There would be the same number of these calculators as in FIG. 5, all operating in parallel, and the numbers of coded bits are respectively applied to the means 46 of FIG. 5 for choosing the block with the minimum number. When this block is designated its pixel values are provided to the negative input of the subtracter 4. Thus, the pixels in the block having the minimum number of bits are subtracted from the corresponding pixels in the data block supplied to the positive input of the subtracter 4.

Once again, it is emphasized that a motion block can differ in size and shape from a data block, but it will usually contain an integral number of data blocks so that their signals can be respectively coupled to the negative input of the subtracter 4 whenever signals from the corresponding data block within the motion block are supplied to the positive input of the subtracter 4.

The criterion of minimum number of codified bits that is used in this invention is consistent with the entire purpose of the codifying system, namely, the reduction in bits. In some cases this may result in the selection of a block in the previous frame that pictorially differs from the motion block by a greater amount than blocks selected by other criteria such as MABD and MSBD.

Figure 7:
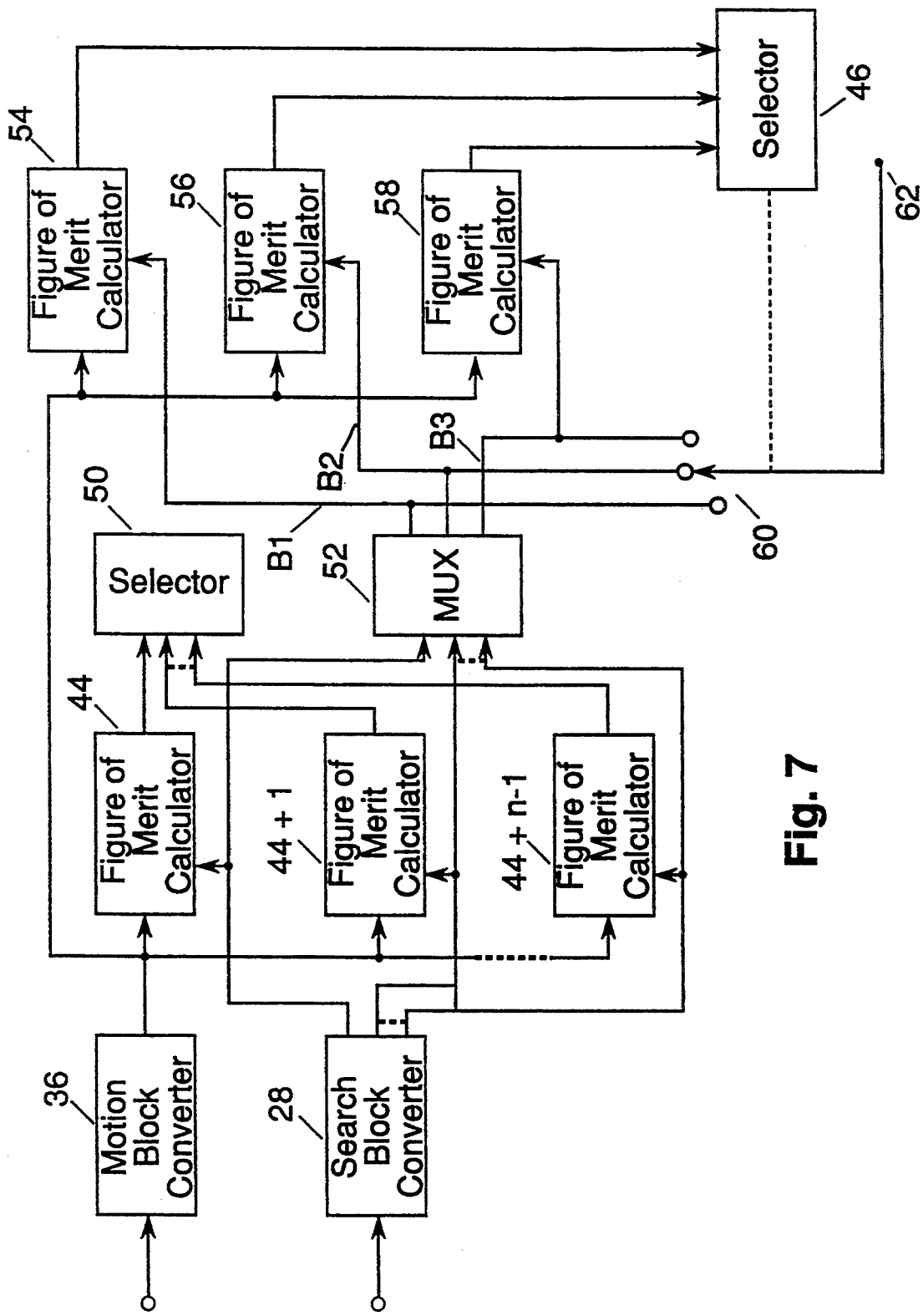
FIG. 7 is a block diagram for a hybrid system having a motion block matching system using a criterion like MABD or MSBD for selecting a number of blocks in the previous frame followed by a motion block matching system utilizing the least number of codified bits as the criterion for making a final selection.

Reference is now made to FIG. 7 in which one criterion like MABD or MSBD is used to obtain several blocks having figures of merit within a given range and wherein one of these is selected on the basis of a minimum number of codified bits. Those blocks corresponding in function to the blocks of FIG. 5 are designated by the same numbers and need no further description, but it is understood that the figure of merit calculators 44 to (44+n−1) are operating in accordance with an MABD or MSBD criterion. Instead of selecting the block with the best figure of merit, a block 50 selects the block that has the best figure of merit and several having the next best figures of merit. The data for these matching blocks is respectively output by multiplexer 52.

Assuming that the outputs of three blocks indicated at B1, B2 and B3 are selected, their data is respectively supplied to block matching figure of merit calculators 54, 56 and 58 that function as described in FIG. 6 to provide figures of merit based on the number of codified bits required to transmit the block. The signals in the motion block are supplied to the figure of merit calculators 54, 56 and 58. A selector 46 selects the one of B1, B2 and B3 requiring the least codifying bits and operates a switch 60 so as to connect the data line for the selected block to an output 62 that will supply signals to the negative input of the subtracter 4. In the drawing, B2 is the matching block. In FIG. 7, the block B2 is shown as being selected.

What is claimed:

1. Motion compensation apparatus to be used in a system that reduces bandwidth used to transmit a frame of data by codifying differences between data in the frame and data predicted to be in the frame according to a predetermined encoding method and transmitting the encoded differences, said apparatus comprising:

means for providing a current frame of data;

means for providing a motion block of data from the current frame;

means for providing data from a frame other than the current frame;

means for simultaneously deriving a plurality of differences between the motion block of data and a respective plurality of similarly shaped blocks of data within a search area including a block shaped area in the other frame having a location corresponding to the location of the motion block in the current frame;

means for simultaneously determining a respective number of bits used to codify each of the plurality of differences using said predetermined coding method; and means for selecting one of said plurality of differences which is encoded into a smaller number of bits than any other one of said plurality of differences as the differences to be transmitted.

2. Apparatus for use in a system which reduces bandwidth used to transmit signals representing an image by codifying a block of difference values representing differences between a data block in a current frame and a matching block in a frame other than the current frame using a predetermined method of encoding, wherein said apparatus is used to identify the matching block and comprises:

means for making available data of the other frame;

means for providing data for the motion block in the current frame;

means for simultaneously deriving respective blocks of difference values representing differences between the data for the motion block and each of a plurality of like blocks in the other frame;

means for simultaneously determining numbers of bits used to codify the respective blocks using the predetermined method of encoding, and means for selecting as a matching block the one of said like blocks in the other frame resulting in the least number of bits for codification using the predetermined method of encoding.

3. Apparatus as set forth in claim 2 wherein the predetermined method of encoding is implemented using means for performing the function of a discrete cosine transform (DCT) followed by a quantizer.

4. Apparatus for identifying a block of data in a previous frame of video information that is to be a predicted data block in a system that codifies differences between data in the predicted block and data in a current data block according to a predetermined method of encoding, said apparatus comprising:

means for providing data from the previous frame;

means for providing data in a motion block of the current frame for which the predicted data block is to be found in the previous frame;

means for deriving a respective plurality of differences between data in the motion block and a plurality of like blocks in the previous frame;

means for determining a figure of merit for each of the plurality of differences, the figure of merit representing a degree to which each of the respective plurality of like blocks matches the motion block;

means for selecting a number of the plurality of differences responsive to the determined figures of merit, the number of selected differences being less than all of the plurality of differences;

means for determining a respective number of bits used to codify each of the selected differences using the predetermined method of encoding; and means for identifying one of the like blocks in the previous frame, as the predicted data block, which identified block has respective derived differences which are codified in the least number of bits using the predetermined method of encoding.

5. Apparatus for selecting a matching block in a previous frame that is to be used as a predicted block in a system that codifies differences between data in the predicted block and data in a motion block in a current frame according to a predetermined method of encoding, said apparatus comprising:

means for providing data within the motion block in the current frame;

means for providing data from the previous frame;

means for deriving respective data differences between data in the motion block and data in a plurality of like areas in the previous frame;

means for identifying a given number of the like blocks in the previous frame, which identified like blocks have the least differences with said motion block said given number being less than all of the plurality of like areas;

means for determining respective numbers of bits used to codify, according to the predetermined encoding method, the data difference between data in each of said given number of blocks and data within said motion block; and means for selecting the one of said given number of blocks resulting in the least number of bits as the matching block.

6. Apparatus for selecting a matching data block of pixels in a previous frame that is to be used as a predicted data block of pixels in a system that codifies, according to a predetermined method of encoding, differences between a current data block in a current frame and the predicted block of data selected from the previous frame as a prediction of what the current data block will be, said apparatus comprising:

means for making available a block of data from a current frame as the current data block;

means for simultaneously making available data from the previous frame in each of a plurality of blocks of data like the current block that are from an area in the previous frame which includes a block-shaped area corresponding to the position of the current block in the current frame;

means for deriving a respective plurality of differences between data in the current data block and the plurality of like blocks in the previous frame;

means for simultaneously determining a figure of merit for each of the plurality of differences, the figure of merit representing a degree to which each of the respective plurality of like blocks matches the current block;

means for selecting a number of the plurality of differences responsive to the determined figures of merit, the number of selected differences being less than all of the plurality of differences;

means for simultaneously determining a plurality of numbers of bits used to codify, using the predetermined method of encoding, the selected differences between the data in said current block and the data in each of said plurality of blocks from the previous frame; and means for selecting as the matching block of pixel values the one of said plurality of blocks from the previous frame which corresponds to a respective one of the selected differences for which the number of bits for codifying the one difference is the smallest.

7. Apparatus for selecting a matching data block of pixels in a previous frame that is to be used as a predicted data block of pixels in a system that codifies, according to a predetermined method of encoding, differences between a current data block in a current frame and the matching block of data selected from the previous frame as a prediction of what the current data block will be, said apparatus comprising:

means for making available the current block of data from the current frame;

means for making available data from the previous frame in each of a plurality of blocks, like the current block, that are from an area in the previous frame including a block shaped area corresponding in position to the current block in the current frame;

means for determining respective differences between data in the current block and each of said plurality of blocks from the previous frame;

means for deriving a plurality of numbers representing respective differences in magnitude between the data in said current block and the data in each of said plurality of blocks from the previous frame;

means for designating, as a selected block, one of said plurality of blocks having the smallest difference number and several blocks having respective next smaller difference numbers, the one block and the several blocks being smaller in number than the plurality of blocks from the previous frame;

means for determining a respective number of bits produced by codifying, using said predetermined method of encoding, the respective differences between data in said current block and data in each of said selected blocks; and means for selecting as said matching block the one of said selected blocks for which the number of bits produced by codifying said one selected block, using said predetermined method of encoding, is the least.

8. Apparatus as set forth in claim 7 wherein each of said plurality of numbers is a sum of the absolute differences in amplitude between the pixels in the current block and the corresponding pixels in a respective one of said plurality of blocks from the previous frame.

9. Apparatus as set forth in claim 7 wherein each of said plurality of numbers is a sum of the squares of the absolute differences in amplitude between corresponding pixels in the current block and the pixels in a respective one of said plurality of blocks from the previous frame.

10. A method for selecting data from a previous frame that will be used as a prediction of data in a current frame to encode the data in the current frame, said method comprising the steps of:

deriving respective differences between data in a motion block in the current frame and each of a plurality of like blocks in the previous frame;

determining a figure of merit for each of the respective derived differences, the figure of merit representing a degree to which each of the respective plurality of like blocks matches the motion block;

selecting a number of differences from the plurality of derived differences responsive to the determined figures of merit, the number of selected differences being less than all of the derived differences;

determining a respective number of bits produced by encoding each of the selected derived differences; and selecting, for codification, one of said plurality of blocks having the selected derived difference from said motion block which produces the least number of bits when the derived difference is encoded.

11. A method for selecting data from a previous frame for use as a prediction of data in a current frame to encode the data in the current frame, said method comprising the steps of:

deriving respective differences between pixels in a motion block in the current frame and corresponding pixels in each of a plurality of like blocks in the previous frame;

deriving respective sums of absolute differences between pixels in the motion block and corresponding pixels in each of a plurality of the like blocks in the previous frame;

designating the one of the blocks in the previous frame which has the smallest sum and several blocks having respectively next smaller sums, the one block and the several blocks being smaller in number than the plurality of like blocks from the previous frame;

determining a respective number of bits produced by codifying the differences for each of the designated blocks; and selecting the block which produces the least number of bits on codification as the prediction of data in the motion block in the current frame.

* * * * *